(12) United States Patent
Gilson et al.

(10) Patent No.: US 10,066,548 B2
(45) Date of Patent: Sep. 4, 2018

(54) ACOUSTIC LINER WITH VARIED PROPERTIES

(71) Applicant: United Technologies Corporation, Hartford, CT (US)

(72) Inventors: Jonathan Gilson, W. Hartford, CT (US); Constantine Baltas, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 427 days.

(21) Appl. No.: 14/766,267

(22) PCT Filed: Mar. 11, 2014

(86) PCT No.: PCT/US2014/023024
§ 371 (c)(1),
(2) Date: Aug. 6, 2015

(87) PCT Pub. No.: WO2014/197035
PCT Pub. Date: Dec. 11, 2014

(65) Prior Publication Data
US 2015/0369127 A1   Dec. 24, 2015

Related U.S. Application Data

(60) Provisional application No. 61/790,109, filed on Mar. 15, 2013.

(51) Int. Cl.
*F02C 7/045* (2006.01)
*F01D 25/24* (2006.01)
(Continued)

(52) U.S. Cl.
CPC .............. *F02C 7/045* (2013.01); *F01D 25/24* (2013.01); *F02C 7/24* (2013.01); *F02K 1/827* (2013.01);
(Continued)

(58) Field of Classification Search
CPC .. F02C 7/045; F02C 7/24; F02C 3/107; F01D 25/24; F02K 1/827; F02K 1/44;
(Continued)

(56) References Cited

U.S. PATENT DOCUMENTS 2,917,276 A   12/1959   Klompas et al.
3,443,791 A   5/1969   Sevetz et al.
(Continued)

FOREIGN PATENT DOCUMENTS

EP   0225805 A1   6/1987
EP   0305159 A2   3/1989
(Continued)

OTHER PUBLICATIONS

Extended European Search Reported for EP Application No. 14807350.5 dated Oct. 21, 2016 8 pages.
(Continued)

*Primary Examiner* — Mark Laurenzi
*Assistant Examiner* — Mickey France
(74) *Attorney, Agent, or Firm* — Kinney & Lange, P.A.

(57) ABSTRACT

A geared turbofan engine includes a first rotor, a fan, a second rotor, a gear train, a fan casing, a nacelle and a plurality of discrete acoustic liner segments. The fan is connected to the first rotor and is capable of rotation at frequencies between 200 and 6000 Hz and has a fan pressure ratio of between 1.25 and 1.60. The gear train connects the first rotor to the second rotor. The fan casing and nacelle are arranged circumferentially about a centerline and define a bypass flow duct in which the fan is disposed. The plurality of discrete acoustic liner segments with varied geometric properties are disposed along the bypass flow duct.

36 Claims, 3 Drawing Sheets

(51) Int. Cl.
  *F02K 1/82* (2006.01)
  *F02C 7/24* (2006.01)
  *F02C 3/107* (2006.01)

(52) U.S. Cl.
  CPC .......... *F02C 3/107* (2013.01); *F05D 2240/40* (2013.01); *F05D 2250/00* (2013.01); *F05D 2250/283* (2013.01); *F05D 2250/37* (2013.01); *F05D 2260/963* (2013.01)

(58) Field of Classification Search
  CPC ............. F05D 2250/00; F05D 2250/37; F05D 2250/283; F05D 2240/40; F05D 2260/96; F05D 2260/963; F16L 55/033; F16L 55/02727; G10K 11/172; B64D 33/02; B64D 2033/02066; B64D 2033/0286
  USPC .................................. 415/119; 181/210, 214
  See application file for complete search history.

(56) References Cited

U.S. PATENT DOCUMENTS

| | | |
|---|---|---|
| 3,508,838 A | 4/1970 | Martenson |
| 3,656,822 A | 4/1972 | Schwartzman |
| 3,937,590 A | 2/1976 | Mani |
| 1,490,923 A | 11/1977 | Marshall |
| 4,274,805 A | 6/1981 | Holmes |
| 4,298,090 A | 11/1981 | Chapman |
| 4,321,897 A | 3/1982 | Pelekis |
| 4,478,551 A | 10/1984 | Honeycutt, Jr. et al. |
| 4,648,792 A | 3/1987 | Baran, Jr. et al. |
| 4,863,678 A | 9/1989 | Shockling et al. |
| 4,989,406 A | 2/1991 | Vdoviak et al. |
| 5,141,395 A | 8/1992 | Carroll et al. |
| 5,165,848 A | 11/1992 | Plemmons |
| 5,175,401 A | 12/1992 | Arcas et al. |
| 5,295,787 A | 3/1994 | Leonard et al. |
| 5,478,199 A | 12/1995 | Gliebe |
| 5,979,593 A | 11/1999 | Rice et al. |
| 6,152,698 A | 11/2000 | Gregg et al. |
| 6,202,302 B1 | 3/2001 | Descoteaux |
| 6,360,844 B2 | 3/2002 | Hogeboom et al. |
| 6,609,592 B2 | 8/2003 | Wilson |
| 6,711,900 B1 | 3/2004 | Patel et al. |
| 6,925,809 B2 | 8/2005 | Mowill |
| 6,942,453 B2 | 9/2005 | Tsuru et al. |
| 7,303,372 B2 | 12/2007 | West et al. |
| 7,347,662 B2 | 3/2008 | Balsdon |
| 7,540,354 B2 | 6/2009 | Morin et al. |
| 7,549,845 B2 | 6/2009 | Uwami et al. |
| 7,572,098 B1 | 8/2009 | Johnson |
| 7,631,483 B2 | 12/2009 | Mani et al. |
| 7,963,362 B2 | 6/2011 | Lidoine |
| 8,040,007 B2 | 10/2011 | Petrov et al. |
| 2002/0023729 A1 | 2/2002 | Didion et al. |
| 2003/0006090 A1 | 1/2003 | Reed |
| 2004/0067131 A1 | 4/2004 | Joslin |
| 2004/0169122 A1 | 9/2004 | Dodd et al. |
| 2006/0169532 A1 | 8/2006 | Patrick |
| 2006/0169533 A1 | 8/2006 | Patrick |
| 2007/0234726 A1 | 10/2007 | Patel et al. |
| 2009/0162187 A1 | 6/2009 | Merry et al. |
| 2010/0111675 A1 | 5/2010 | Wojtyczka et al. |
| 2010/0232940 A1 | 9/2010 | Ammann |
| 2010/0251692 A1 | 10/2010 | Kinde, Sr. |
| 2010/0290892 A1 | 11/2010 | Schwaller |
| 2011/0004388 A1 | 1/2011 | Winter |
| 2011/0005054 A1 | 1/2011 | Maurell et al. |
| 2011/0115223 A1 | 5/2011 | Stahlkopf et al. |
| 2012/0076659 A1 | 3/2012 | Robertson |
| 2012/0085861 A1 | 4/2012 | Mardjono et al. |
| 2012/0099969 A1 | 4/2012 | Gilman |
| 2012/0111012 A1 | 5/2012 | Axelsson et al. |
| 2012/0128482 A1 | 5/2012 | Dezouche et al. |

FOREIGN PATENT DOCUMENTS

| | | |
|---|---|---|
| EP | 0305159 A3 | 1/1990 |
| EP | 0225805 B1 | 3/1990 |
| EP | 0305159 B1 | 11/1993 |
| EP | 2236763 A2 | 10/2010 |
| GB | 2226600 A | 7/1990 |
| GB | 2407344 A | 4/2005 |
| GB | 2441148 A | 2/2008 |
| JP | 2007292052 A | 11/2007 |
| WO | 2004070275 A1 | 8/2004 |
| WO | 2011106073 A2 | 9/2011 |
| WO | 2012007716 A1 | 1/2012 |

OTHER PUBLICATIONS

The International Search Report dated Dec. 22, 2014 for International Application No. PCT/US2014/023024.

ACOUSTIC LINER WITH VARIED PROPERTIES

CROSS-REFERENCE TO RELATED APPLICATION(S)

This application claims the benefit of U.S. Provisional Application No. 61/790,109 filed Mar. 15, 2013, for "Acoustic Liner with Varied Properties" by Jonathan Gilson and Constantine Baltas, and claims the benefit of PCT application PCT/US2014/023024 filed Mar. 11, 2014, for "Acoustic Liner with Varied Properties" by Jonathan Gilson and Constantine Baltas.

BACKGROUND

This disclosure relates to gas turbine engines, and in particular, to an acoustic liner assembly for reducing emitted noise propagating through a duct.

During operation, an aircraft propulsion system generates noise that requires attenuation and control. The noise generated by operation of the aircraft propulsion system is of many different frequencies, some of which contribute disproportionately more noise to the overall emitted noise. Accordingly, the aircraft propulsion system is provided with a noise attenuation liner. Ideally, the noise attenuation liner will reduce or eliminate noise of all frequencies generated within the propulsion system. However, practical limitations reduce the efficient attenuation of noise at some frequencies in favor of other noise frequencies. For these reasons, noise attenuation liners are only tuned or tailored to attenuate the most undesirable frequencies with the greatest efficiency. Unfortunately, the compromises required to efficiently attenuate the most undesirable frequencies limits the effective attenuation of other noise frequencies.

SUMMARY

A geared turbofan engine includes a first rotor, a fan, a second rotor, a gear train, a fan casing, a nacelle and a plurality of discrete acoustic liner segments. The fan is connected to the first rotor and is capable of rotation at frequencies between 200 and 6000 Hz and has a fan pressure ratio of between 1.25 and 1.60. The gear train connects the first rotor to the second rotor. The fan casing and nacelle are arranged circumferentially about a centerline and define a bypass flow duct in which the fan is disposed. The plurality of discrete acoustic liner segments with varied geometric properties are disposed along the bypass flow duct.

A geared turbofan engine includes a gear train, a first rotor, a second rotor, a core casing, a nacelle, a fan casing, and an acoustic liner. The gear train connects the first rotor to the second rotor. The core casing extends circumferentially around the first rotor and defines a portion of an inner surface of a bypass flow duct. The nacelle and the fan casing extend circumferentially around the core casing and define an outer surface of the bypass flow duct. The acoustic liner has two or more zones disposed along the bypass flow duct. The two or more zones are tuned to attenuate a different frequency range of acoustic noise.

A gas turbine engine includes a fan, a fan casing, a nacelle, and a plurality of discrete acoustic liner segments. The fan is rotatably arranged along an axial centerline. The fan casing and the nacelle are arranged circumferentially around the centerline and define a bypass flow duct in which the fan is disposed. The plurality of discrete acoustic liner segments with varied geometric properties are disposed along the bypass flow duct.

A gas turbine engine includes a core casing, a nacelle, a fan casing, a fan, and an acoustic liner. The core casing extends circumferentially around the first rotor and defines a portion of an inner surface of a bypass flow duct. The nacelle and the fan casing extend circumferentially around the core casing and define an outer surface of the bypass flow duct. The fan is rotatably disposed in the bypass flow duct. The acoustic liner has two or more zones disposed in the bypass flow duct. The two or more zones are tuned to attenuate a different frequency range of acoustic noise.

DETAILED DESCRIPTION

Figure 1:
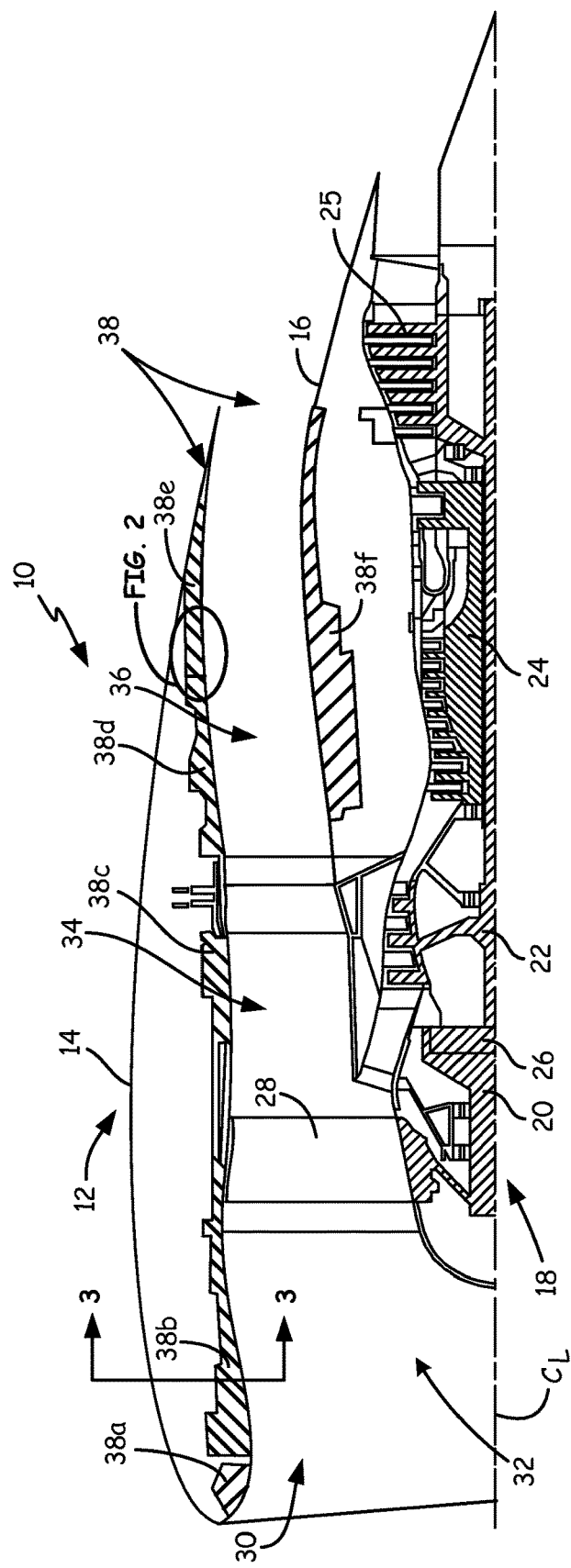
FIG. 1 is a cross-sectional side view of a geared turbofan engine with an acoustic liner.

As turbofan engines become increasingly more complex and efficient, their bypass ratios increase. A higher bypass ratio in a turbofan engine 10 leads to better fuel burn because the fan 28 is more efficient at producing thrust than the core engine 18. The introduction of a fan drive gear system 26 for turbofan engines 10 has also led to bypass ducts of shorter length. As a result, the total amount of available area for acoustic lining in a turbofan engine 10 with a fan drive gear system 26 is much less than for a direct drive engine. Additionally, a turbofan engine 10 with a fan drive gear system 26 creates asymmetric acoustics throughout the inside of the bypass duct. The turbofan engine 10 described herein utilizes an acoustic liner assembly 38 with varied geometric properties implemented in the bypass duct. These varied geometric properties include varying the radial thicknesses of one or more face sheets along an axial and/or circumferential length of the bypass duct, varying the radial thicknesses (sometimes called the depth) of one or more cores along an axial and/or circumferential length of the bypass duct, and/or varying the porosities of the one or more face sheets and/or one or more cores along an axial and/or circumferential length of the bypass duct. Thus, a three dimensional (axially, radially, and circumferentially) varied acoustic liner assembly 38 is created having regions with different non-uniform geometric properties. This allows the acoustic liner assembly 38 to be optimized based on the noise characteristics in particular locations/sections of the bypass duct. As a result of the varied geometric properties of acoustic liner assembly 38, multiple specific problematic frequency ranges within particular locations/sections of the bypass duct can be targeted and attenuated, reducing overall engine noise. Liner assembly 38 realizes noise reduction benefits for both tone noise and broadband noise. Depending on the blade passage frequency harmonic considered, estimated tone noise reductions at the component level may be up to 10 dB or more for tone acoustic power level. At the aircraft level, tone noise benefits of the liner assembly 38 provide a cumulative noise reduction of approximately 1-2 EPNdB.

FIG. 1 shows turbofan engine 10 with fan drive gear system 26, commonly called a geared turbofan. Although described with reference to a geared turbofan in the embodiment disclosed, the acoustic liner described herein is equally applicable to other types of gas turbine engines including three-spool architectures. Turbofan engine 10 includes nacelle 12 with outer cowl 14 and core cowl 16, and core 18. Core 18 includes first rotor 20, low speed spool 22, high speed spool 24, and fan drive gear system 26.

Fan 28 is connected to first rotor 20. Outer cowl 14 and core cowl 16 form bypass duct 30, which extends axially along engine 10 centerline axis $C_L$. Fan 28 is disposed to rotate within bypass duct 30. Inlet section 32 of bypass duct 30 is situated forward of fan 28. Fan section 34 of bypass duct 30 is situated around fan 28 and aft thereof. Rear section 36 of bypass duct 30 is disposed aft of fan section 34.

Liner assembly 38 is disposed on nacelle 12 and forms the surface of bypass duct 30. In particular, liner assembly 38 extends axially along and circumferentially around bypass duct 30. Additionally, liner assembly 38 has a thickness or depth and extends radially into outer cowl 14 and core cowl 16. In the embodiment of FIG. 1, liner assembly 38 has varied geometric properties such as differing radial thicknesses and porosities along the axial and circumferential length of bypass duct 30. In the embodiment of FIG. 1, liner assembly 38 is comprised of separate discrete liner segments 38a, 38b, 38c, 38d, 38e, and 38f each having varied geometric properties such as differing thicknesses and porosities along the axial length thereof. Liner segments 38a, 38b, 38c, 38d, 38e, and 38f can be further separated into additional segments or may be continuous in the circumferential direction. In yet other embodiments, liner segments 38a, 38b, 38c, 38d, 38e, and 38f may be instead constructed as a continuous liner assembly 38.

Liner segments 38a and 38b are disposed along and form inlet section 32 of bypass duct 30. Liner segment 38a is spaced from liner segment 38b and is disposed near a forward lip of bypass duct 30. Liner segment 38b extends adjacent to fan 28. Liner segment 38c extends around fan 28 and rearward thereof. Liner segment 38c forms fan section 34 of bypass duct 30. Liner segments 38d and 38e are mounted to outer cowl 14 and form a portion of rear section 36 of bypass duct 30. Rear section 36 is also formed by liner segment 38f which is mounted to core cowl 16.

In operation, fan 28 drives air along bypass flowpath 30 from inlet section 32 to rear section 36, while the compressor section within core 18 drives air along a core flowpath for compression and communication into the combustor section then expansion through the turbine section. As used herein, terms such as "front", "forward", "aft", "rear", "rearward" should be understood as relative positional terms in reference to the direction of airflow through engine 10.

In the embodiment of FIG. 1, engine 10 generally includes low speed spool 22 also (referred to as the low pressure spool) and a high speed spool 24 (also referred to as the high pressure spool). The spools 22, 24 are mounted for rotation about an engine central longitudinal axis $C_L$ relative to an engine static structure via several bearing systems. It should be understood that various bearing systems at various locations may alternatively or additionally be provided.

Low speed spool 22 generally includes a shaft that interconnects low pressure compressor and low pressure turbine. Low speed spool 22 is connected to and drives first rotor 20 through fan drive gear system 26 to drive the fan 42 at a lower speed than low speed spool 22. High speed spool 24 includes a shaft that interconnects high pressure compressor and high pressure turbine. Shafts are concentric and rotate via bearing systems about the engine 10 centerline axis $C_L$.

Engine 10 in one example has a bypass ratio is greater than about six (6), with an example embodiment being greater than ten (10). Fan drive gear system 26 is an epicyclic gear train, such as a planetary gear system or other gear system, with a gear reduction ratio equal to or greater than about 2.3. In one particular embodiment, fan drive gear system 26 may be an epicycle gear train, with a gear reduction ratio greater than about 2.5:1.

Low pressure turbine 25 has a pressure ratio that is greater than about five (5). In one disclosed embodiment, the bypass ratio of engine 10 is greater than about ten (10:1), and the diameter of fan 28 is significantly larger than that of the low pressure compressor. The Low pressure turbine 25 pressure ratio is pressure measured prior to inlet of low pressure turbine as related to the pressure at the outlet of low pressure turbine prior to an exhaust nozzle.

In one embodiment, fan 28 rotates at a frequency of between 200 and 6000 Hz. Acoustic frequencies within this range can be targeted such that liner assembly 38 can be tuned to attenuate frequencies between 200 and 6000 Hz. In other embodiments, liner assembly 38 can be tuned to attenuate frequencies less than 1000 Hz. One purpose of having liner assembly 38 with varied geometric properties (including different radial thicknesses) is to target blade passage tone noise which, for lower fan blade count turbomachinery and lower pressure ratio applications, exists at frequencies less than 1000 Hz.

Constructing one portion of liner with geometric properties (including a radial thickness) targeting these low frequencies will reduce the blade passage noise below 1000 Hz, while other portions of liner assembly 38 with different material and/or geometric properties will attenuate the rest of the tones and broadband noise at higher frequencies. It should be understood, however, that the above parameters are only exemplary of one embodiment of a geared architecture engine and that the present invention is applicable to other gas turbine engines including direct drive turbofans.

A significant amount of engine thrust is provided by the bypass flow through bypass duct 30 due to the high bypass ratio. Fan 28 is designed for a particular flight condition—typically cruise at about 0.8 Mach and about 35,000 feet. However, liner assembly 38 can attenuate acoustic noise between about 0.3 and 0.9 Mach. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.60. In another non-limiting embodiment, fan pressure ratio is between 1.25 and 1.60. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
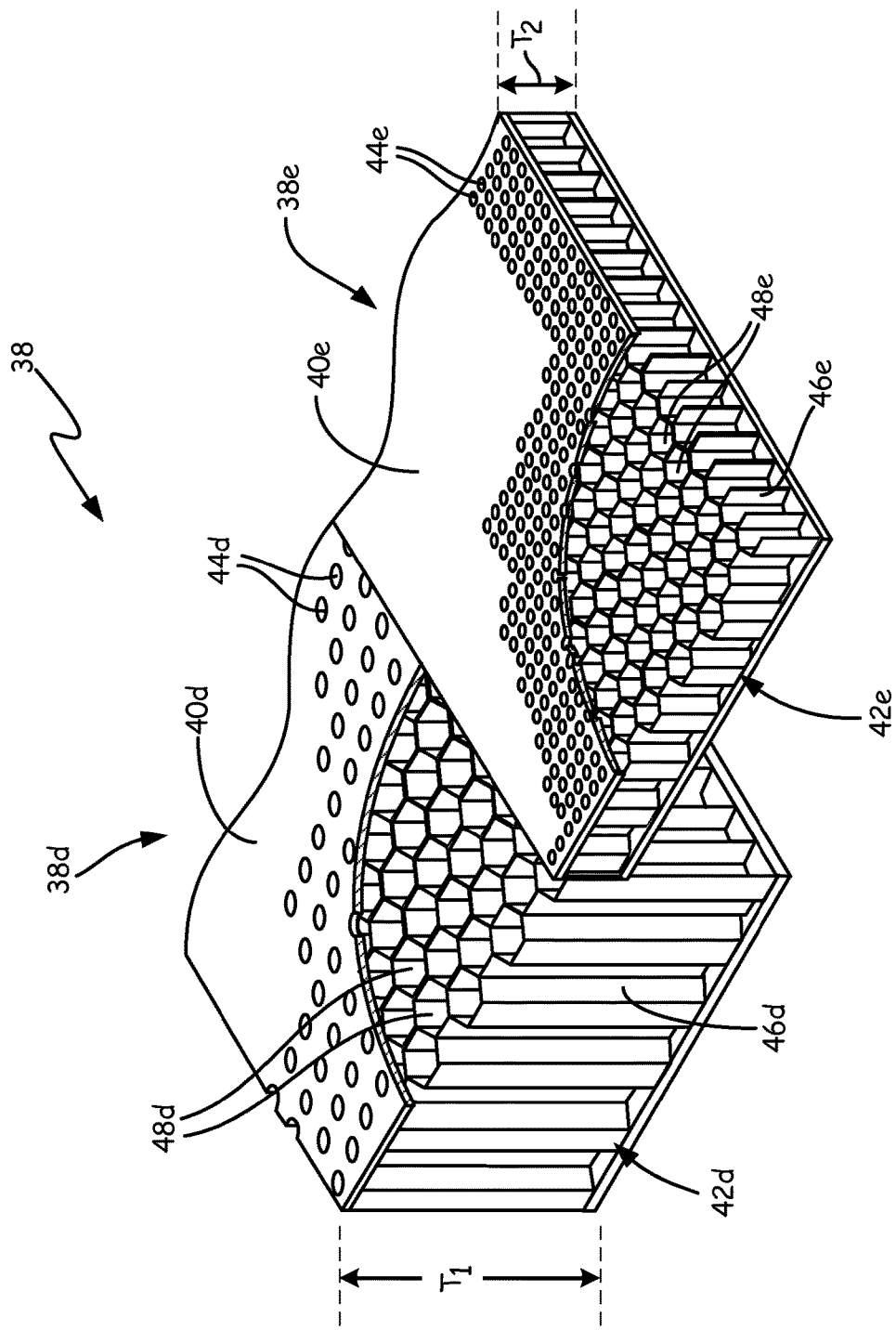
FIG. 2 is a perspective cross-sectional view of the acoustic liner from FIG. 1.

FIG. 2 is enlarged view of a portion of liner assembly 38 from the rear section 36 of bypass duct 30 (FIG. 1). FIG. 2 shows the abutting interface between liner segment 38d and liner segment 38e. Liner segment 38d includes face sheet 40d and core 42d. Face sheet 40d includes apertures 44d. Core 42d includes cells 46d that define cavities 48d. Similarly, in FIG. 2, liner segment 38e includes face sheet 40e and core 42e. Face sheet 40e includes apertures 44e. Core 42e includes cells 46e that define cavities 48e.

In FIG. 2, liner segments 38d and 38e are disclosed as discrete separate segments. Liner segment 38e is illustrated as a microperforated liner. Further discussion of the construction and operation of microperforated liners can be found in U.S. Pat. No. 7,540,354, which is incorporated herein by reference. Face sheets 40d and 40e have exterior surfaces that generally align and form the surface of bypass duct 30 (FIG. 1). Face sheets 40d and 40e are illustrated has having a same thickness in a radial direction with respect to axis centerline CL of engine 10 (FIG. 1) in FIG. 2. However, in other embodiments the thickness of face sheet 40d can vary from the thickness of face sheet 40e.

Face sheets 40d and 40e are bonded or otherwise affixed to cores 42d and 42e. In the embodiment of FIG. 2, cores 42d and 42e have differing (varied) thicknesses $T_1$, $T_2$ in a radial direction with respect to axis centerline $C_L$ of engine 10 (FIG. 1). In this embodiment, the thickness $T_1$ of core 42d is greater than the thickness $T_2$ of core 42e. In FIG. 2, cells 46d and 46e are illustrated with a similar hexagonal cross-sectional shape. However, in other embodiments cell shape can differ (for example have a circular cross-section) between liner segments 38d and 38e and cell size can vary between liner segments 38d and 38e. Thus, the cavities 48d and 48e formed by cells 46d and 46e may vary from one another in size and shape. As illustrated, cores 42d and 42e can be bonded or otherwise affixed to backing plates.

Figure 3:
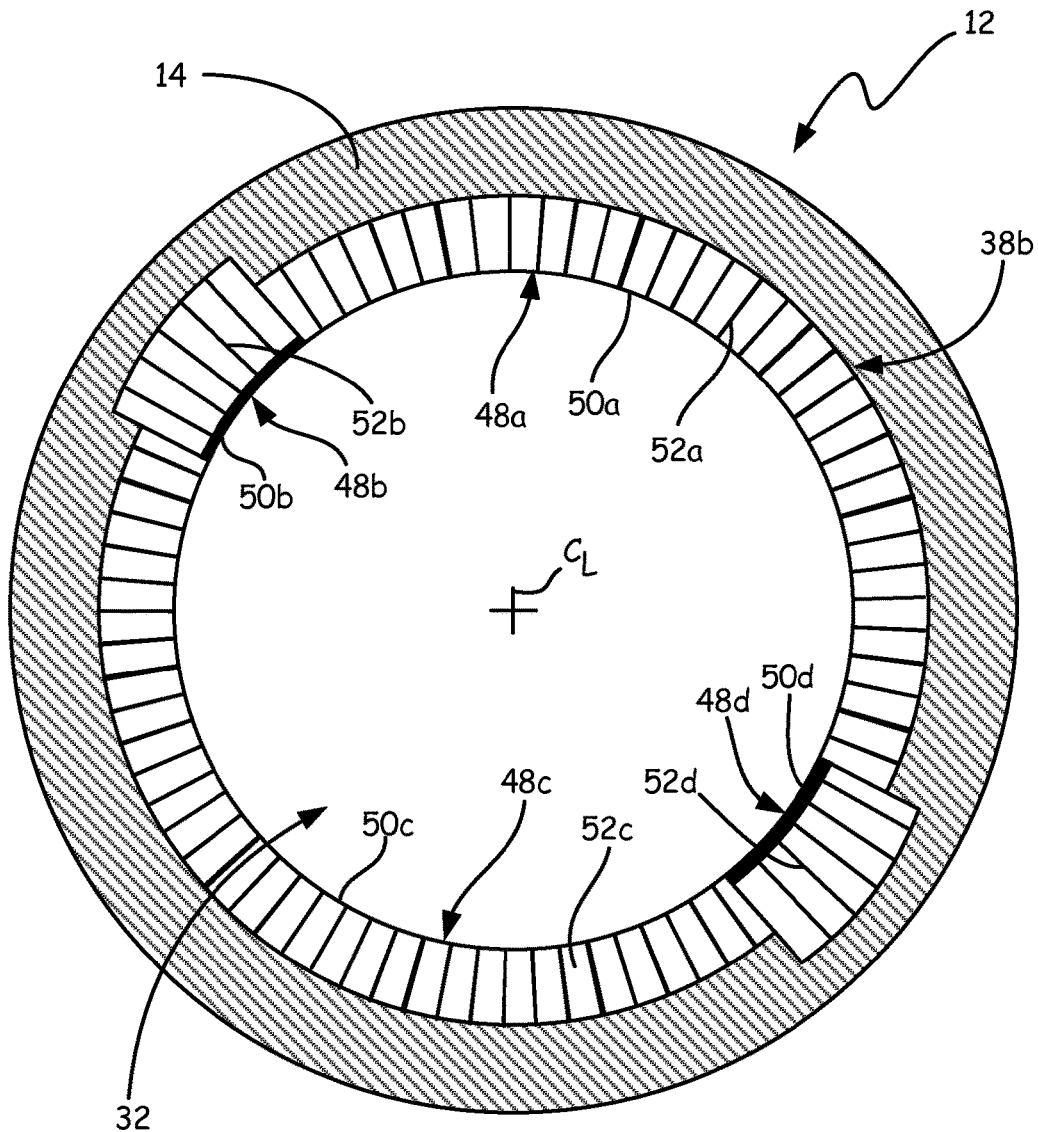
FIG. 3 is a cross-sectional view a portion of nacelle from FIG. 1 with a continuous acoustic liner.

FIG. 3 illustrates another cross-section of liner segment 38b and nacelle 12. The cross-section of FIG. 3 extends through outer cowl 14 in inlet section 32 of bypass duct 30 (FIG. 1). As shown in FIG. 3, liner segment 38b is continuously varied in a circumferential direction. Thus, liner segment 38b is one structure but is comprised (in the illustrated embodiment) of four zones 48a, 48b, 48c, and 48d. In the embodiment of FIG. 3, zones 48a and 48c exhibit similar geometric properties as zones 48a and 48c have similar radial thicknesses and porosities along the circumferential length of inlet duct 32 illustrated. Zones 48b and 48d have similar geometric properties as zones 48a and 48c have similar radial thicknesses and porosities along the circumferential length of inlet duct 32 illustrated. However, the geometric properties (i.e. radial thicknesses and porosities) of zones 48a and 48c differ (vary) from the geometric properties of zones 48b and 48d.

As shown in FIG. 3, zones 48a and 48c have similar properties because face sheets 50a and 50c have similar radial thicknesses with respect to engine centerline axis $C_L$, and have similar porosities. Similarly, zones 48b and 48d have similar properties because face sheets 50b and 50d have similar radial thicknesses with respect to engine centerline axis $C_L$, and have similar porosities. However, the radial thicknesses and porosities of face sheets 50a and 50c differ from the radial thicknesses and porosities of face sheets 50b and 50d.

Additionally, zones 48a and 48c have similar properties because cores 52a and 52c have similar radial thicknesses with respect to engine centerline axis $C_L$ and have similar porosities. Similarly, zones 48b and 48d have similar properties because cores 52b and 52d have similar radial thicknesses with respect to engine centerline axis $C_L$ and have similar porosities. However, the radial thicknesses and porosities of cores 52a and 52c differ from the radial thicknesses and porosities of cores 52b and 52d.

Fan noise source content may vary significantly in the circumferential direction with respect to engine centerline axis $C_L$. Liner assembly 38, by virtue of its with varied properties in a circumferential direction, allows alignment of high noise source magnitudes with optimal liner properties.

It should be understood that the embodiments of the FIGURES are purely exemplary. For example, rather than being segmented as discussed with reference to FIGS. 1 and 2, liner assembly 38 can be one continuously varied unit (both axially and circumferentially) for most or all of the axial length of bypass duct 30. In other embodiments, continuously varied liner segments (in either the axial or circumferential direction) can be utilized in combination with discrete separate liner segments (in either the axial or circumferential direction) along bypass duct 30.

Discussion of Possible Embodiments

The following are non-exclusive descriptions of possible embodiments of the present invention.

A geared turbofan engine includes a first rotor, a fan, a second rotor, a gear train, a fan casing, a nacelle and a plurality of discrete acoustic liner segments. The fan is connected to the first rotor and is capable of rotation at frequencies between 200 and 6000 Hz and has a fan pressure ratio of between 1.25 and 1.60. The gear train connects the first rotor to the second rotor. The fan casing and nacelle are arranged circumferentially about a centerline and define a bypass flow duct in which the fan is disposed. The plurality of discrete acoustic liner segments with varied geometric properties are disposed along the bypass flow duct.

The geared turbofan engine of the preceding paragraph can optionally include, additionally and/or alternatively, any one or more of the following features, configurations and/or additional components:

at least one discrete acoustic liner segment of the plurality of discrete acoustic liner segments is disposed on an inner surface of the nacelle inside the bypass flow duct;

at least one discrete acoustic liner segment of the plurality of discrete acoustic liner segments is disposed on an inner surface of the fan casing inside the bypass flow duct;

a core casing arranged circumferentially around the centerline within the nacelle and the fan casing and defining an inner surface of the bypass flow duct, and at least one discrete acoustic liner segment of the plurality of discrete acoustic liner segments is disposed on the inner surface of the bypass flow duct;

each of the plurality of discrete acoustic liner segments includes a cellular core structure, and wherein the cellular core structure of one of the plurality of discrete acoustic liners has a depth that differs from a depth of the cellular core structure of another of the plurality of discrete acoustic liner segments;

the cellular core structure of each of the plurality of discrete acoustic liner segments includes one or more resonator chambers, and wherein one of the one or more resonator chambers has a circumference that differs from a circumference of another of the one or more resonator chambers;

a cross-sectional geometry of the one or more resonator chambers of one of the plurality of discrete acoustic liner segments differs from a cross-sectional geometry of another of the one or more resonator chambers;

each of the plurality of discrete acoustic liner segments includes a face sheet with holes and the holes communicate with the resonator chambers in the cellular core structure, wherein a diameter of the holes in the face sheet of one of the plurality of discrete acoustic liner segments differs from a diameter of holes in the face sheet of another of the plurality discrete acoustic liner segments;

a number of the holes in the face sheet of one of the plurality of discrete acoustic liner segments differs from a number of the holes in the face sheet of another of the plurality of discrete acoustic liner segments;

a thickness of the face sheet of one of the plurality of discrete acoustic liner segments differs from a thickness of the face sheet of another of the plurality of discrete acoustic liner segments; and the face sheet of at least one of the discrete acoustic liner segments is micro-perforated.

A geared turbofan engine includes a gear train, a first rotor, a second rotor, a core casing, a nacelle, a fan casing, and an acoustic liner. The gear train connects the first rotor to the second rotor. The core casing extends circumferentially around the first rotor and defines a portion of an inner surface of a bypass flow duct. The nacelle and the fan casing extend circumferentially around the core casing and define an outer surface of the bypass flow duct. The acoustic liner has two or more zones disposed along the bypass flow duct. The two or more zones are tuned to attenuate a different frequency range of acoustic noise.

The geared turbofan engine of the preceding paragraph can optionally include, additionally and/or alternatively, any one or more of the following features, configurations and/or additional components:

the gear train comprises an epicyclic transmission;

a fan connected to the first rotor, and a low speed spool driving the second rotor, the low speed spool including a low pressure compressor section and a low pressure turbine section;

the fan rotates at frequencies under 1000 Hz and one of the zones is tuned to attenuate frequencies under 1000 Hz;

one of the zones is tuned to attenuate frequencies above 1000 Hz;

the acoustic liner is segmented into discrete axial segments;

the acoustic liner is segmented into discrete circumferential segments;

the acoustic liner is segmented into discrete segments and each discrete segment contains a single zone of the multiple zones; and the acoustic liner is segmented into discrete segments and each discrete segment contains more than one zone of the multiple zones.

A gas turbine engine includes a fan, a fan casing, a nacelle, and a plurality of discrete acoustic liner segments. The fan is rotatably arranged along an axial centerline. The fan casing and the nacelle are arranged circumferentially around the centerline and define a bypass flow duct in which the fan is disposed. The plurality of discrete acoustic liner segments with varied geometric properties are disposed along the bypass flow duct.

The gas turbine engine of the preceding paragraph can optionally include, additionally and/or alternatively, any one or more of the following features, configurations and/or additional components:

at least one discrete acoustic liner segment of the plurality of discrete acoustic liner segments is disposed on an inner surface of the nacelle inside the bypass flow duct;

at least one discrete acoustic liner segment of the plurality of discrete acoustic liner segments is disposed on an inner surface of the fan casing inside the bypass flow duct;

a core casing arranged circumferentially around the centerline within the nacelle and the fan casing and defining an inner surface of the bypass flow duct, and at least one discrete acoustic liner segment of the plurality of discrete acoustic liner segments is disposed on the inner surface of the bypass flow duct;

each of the plurality of discrete acoustic liner segments includes a cellular core structure, and wherein the cellular core structure of one of the plurality of discrete acoustic liners has a depth that differs from a depth of the cellular core structure of another of the plurality of discrete acoustic liner segments;

the cellular core structure of each of the plurality of discrete acoustic liner segments includes one or more resonator chambers, and wherein one of the one or more resonator chambers has a circumference that differs from a circumference of another of the one or more resonator chambers;

a cross-sectional geometry of the one or more resonator chambers of one of the plurality of discrete acoustic liner segments differs from a cross-sectional geometry of another of the one or more resonator chambers;

each of the plurality of discrete acoustic liner segments includes a face sheet with holes and the holes communicate with the resonator chambers in the cellular core structure, wherein a diameter of the holes in the face sheet of one of the plurality of discrete acoustic liner segments differs from a diameter of holes in the face sheet of another of the plurality discrete acoustic liner segments;

a number of the holes in the face sheet of one of the plurality of discrete acoustic liner segments differs from a number of the holes in the face sheet of another of the plurality of discrete acoustic liner segments;

a thickness of the face sheet of one of the plurality of discrete acoustic liner segments differs from a thickness of the face sheet of another of the plurality of discrete acoustic liner segments; and the face sheet of at least one of the discrete acoustic liner segments is micro-perforated.

A gas turbine engine includes a core casing, a nacelle, a fan casing, a fan, and an acoustic liner. The core casing extends circumferentially around the first rotor and defines a portion of an inner surface of a bypass flow duct. The nacelle and the fan casing extend circumferentially around the core casing and define an outer surface of the bypass flow duct. The fan is rotatably disposed in the bypass flow duct. The acoustic liner has two or more zones disposed in the bypass flow duct. The two or more zones are tuned to attenuate a different frequency range of acoustic noise.

The gas turbine engine of the preceding paragraph can optionally include, additionally and/or alternatively, any one or more of the following features, configurations and/or additional components:

the fan rotates at frequencies under 1000 Hz and one of the zones is tuned to attenuate frequencies under 1000 Hz;

one of the zones is tuned to attenuate frequencies above 1000 Hz;

the acoustic liner is segmented into discrete axial segments;

the acoustic liner is segmented into discrete circumferential segments;

the acoustic liner is segmented into discrete segments and each discrete segment contains a single zone of the multiple zones; and the acoustic liner is segmented into discrete segments and each discrete segment contains more than one zone of the multiple zones.

Although the present invention has been described with reference to preferred embodiments, workers skilled in the art will recognize that changes may be made in form and detail without departing from the spirit and scope of the invention.

The invention claimed is:

1. A geared turbofan engine, comprising:
a first rotor;
a fan connected to the first rotor, wherein the fan is capable of rotation at frequencies between 200 and 6000 Hz and has a fan pressure ratio of between 1.25 and 1.60;
a second rotor;
a gear train that connects the first rotor to the second rotor;
a fan casing and a nacelle arranged circumferentially about a centerline and defining a bypass flow duct in which the fan is disposed; and
a plurality of discrete acoustic liner segments having varied geometric properties disposed along the bypass flow duct; wherein the plurality of discrete acoustic liner segments comprises a first acoustic liner segment, and a second acoustic liner segment spaced apart from the first acoustic liner segment;
wherein each the first and second acoustic liner segments includes a cellular core structure, the cellular core structure comprising one or more resonator chambers having a width; and
wherein the width of the one or more resonator chambers of the first acoustic liners differs from the width of the one or more resonator chambers of the second acoustic liner.

2. The geared turbofan engine of claim 1, wherein at least one discrete acoustic liner segment of the plurality of discrete acoustic liner segments is disposed on an inner surface of the nacelle inside the bypass flow duct.

3. The geared turbofan engine of claim 1, wherein at least one discrete acoustic liner segment of the plurality of discrete acoustic liner segments is disposed on an inner surface of the fan casing inside the bypass flow duct.

4. The geared turbofan engine of claim 1, wherein the gas turbine engine further comprises:
a core casing arranged circumferentially around the centerline within the nacelle and the fan casing and defining an inner surface of the bypass flow duct; and
wherein at least one discrete acoustic liner segment of the plurality of discrete acoustic liner segments is disposed on the inner surface of the bypass flow duct.

5. The geared turbofan engine of claim 1, wherein the cellular core structure of one of the plurality of discrete acoustic liners has a depth that differs from a depth of the cellular core structure of another of the plurality of discrete acoustic liner segments.

6. The geared turbofan engine of claim 1, wherein a cross-sectional geometry of the one or more resonator chambers of one of the plurality of discrete acoustic liner segments differs from a cross-sectional geometry of another of the one or more resonator chambers.

7. The geared turbofan engine of claim 1, wherein each of the plurality of discrete acoustic liner segments includes a face sheet with holes and the holes communicate with the resonator chambers in the cellular core structure, wherein a diameter of the holes in the face sheet of one of the plurality of discrete acoustic liner segments differs from a diameter of holes in the face sheet of another of the plurality discrete acoustic liner segments.

8. The geared turbofan engine of claim 7, wherein a number of the holes in the face sheet of one of the plurality of discrete acoustic liner segments differs from a number of the holes in the face sheet of another of the plurality of discrete acoustic liner segments.

9. The geared turbofan engine of claim 7, wherein a thickness of the face sheet of one of the plurality of discrete acoustic liner segments differs from a thickness of the face sheet of another of the plurality of discrete acoustic liner segments.

10. The geared turbofan engine of claim 7, wherein the face sheet of at least one of the discrete acoustic liner segments is micro-perforated.

11. A geared turbofan engine, comprising:
a gear train connecting a first rotor to a second rotor;
a core casing extending circumferentially around the first rotor and defining a portion of an inner surface of a bypass flow duct;
a nacelle and a fan casing extending circumferentially around the core casing and defining an outer surface of the bypass flow duct; and
an acoustic liner with two or more zones disposed along the bypass flow duct, the two or more zones being tuned to attenuate a different frequency range of acoustic noise;
wherein a first zone of the two or more zones comprises a first face sheet having a first radial thickness; and
wherein a second zone of the two or more zones comprises a second face sheet having a second radial thickness different from the first radial thickness.

12. The geared turbofan engine of claim 11, wherein the gear train comprises an epicyclic transmission.

13. The geared turbofan engine of claim 11, wherein the geared turbofan further comprises:
a fan connected to the first rotor; and
a low speed spool driving the second rotor, the low speed spool including a low pressure compressor section and a low pressure turbine section.

14. The geared turbofan engine of claim 13, wherein the fan rotates at frequencies under 1000 Hz and one of the zones of the acoustic liner is tuned to attenuate frequencies under 1000 Hz.

15. The geared turbofan engine of claim 13, wherein one of the zones of the acoustic liner is tuned to attenuate frequencies above 1000 Hz.

16. The geared turbofan engine of claim 11, wherein the acoustic liner is segmented into discrete axial segments.

17. The geared turbofan engine of claim 11, wherein the acoustic liner is segmented into discrete circumferential segments.

18. The geared turbofan engine of claim 11, wherein the acoustic liner is segmented into discrete segments and each discrete segment contains a single zone of the multiple zones.

19. The geared turbofan engine of claim 11, wherein the acoustic liner is segmented into discrete segments and at least one discrete segment contains more than one zone of the multiple zones.

20. A gas turbine engine, comprising:
a fan rotatably arranged along an axial centerline;
a fan casing and a nacelle arranged circumferentially around the centerline and defining a bypass flow duct in which the fan is disposed; and
a plurality of discrete acoustic liner segments with varied geometric properties disposed along the bypass flow duct; wherein the plurality of discrete acoustic liner segments comprises a first acoustic liner segment, and a second acoustic liner segment spaced apart from the first acoustic liner segment;
wherein each the first and second acoustic liner segments includes a cellular core structure, the cellular core structure comprising one or more resonator chambers having a width; and wherein the width of the one or more resonator chambers of the first acoustic liners differs from the width of the one or more resonator chambers of the second acoustic liner.

21. The gas turbine engine of claim 20, wherein at least one discrete acoustic liner segment of the plurality of discrete acoustic liner segments is disposed on an inner surface of the nacelle inside the bypass flow duct.

22. The gas turbine engine of claim 20, wherein at least one discrete acoustic liner segment of the plurality of discrete acoustic liner segments is disposed on an inner surface of the fan casing inside the bypass flow duct.

23. The gas turbine engine of claim 20, wherein the gas turbine engine further comprises:
a core casing arranged circumferentially around the centerline within the nacelle and the fan casing and defining an inner surface of the bypass flow duct; and
wherein at least one discrete acoustic liner segment of the plurality of discrete acoustic liner segments is disposed on the inner surface of the bypass flow duct.

24. The gas turbine engine of claim 20, wherein the cellular core structure of one of the plurality of discrete acoustic liners has a depth that differs from a depth of the cellular core structure of another of the plurality of discrete acoustic liner segments.

25. The gas turbine engine of claim 24, wherein a cross-sectional geometry of the one or more resonator chambers of one of the plurality of discrete acoustic liner segments differs from a cross-sectional geometry of another of the one or more resonator chambers.

26. The gas turbine engine of claim 24, wherein each of the plurality of discrete acoustic liner segments includes a face sheet with holes and the holes communicate with the resonator chambers in the cellular core structure, wherein a diameter of the holes in the face sheet of one of the plurality of discrete acoustic liner segments differs from a diameter of holes in the face sheet of another of the plurality discrete acoustic liner segments.

27. The gas turbine engine of claim 26, wherein a number of the holes in the face sheet of one of the plurality of discrete acoustic liner segments differs from a number of the holes in the face sheet of another of the plurality of discrete acoustic liner segments.

28. The gas turbine engine of claim 26, wherein a thickness of the face sheet of one of the plurality of discrete acoustic liner segments differs from a thickness of the face sheet of another of the plurality of discrete acoustic liner segments.

29. The gas turbine engine of claim 26, wherein the face sheet of at least one of the discrete acoustic liner segments is micro-perforated.

30. A gas turbine engine, comprising:
a core casing extending circumferentially around the first rotor and defining a portion of an inner surface of a bypass flow duct;
a nacelle and a fan casing extending circumferentially around the core casing and defining an outer surface of the bypass flow duct;
a fan rotatably disposed in the bypass flow duct; and
an acoustic liner with two or more zones disposed in the bypass flow duct, wherein the two or more zones being tuned to attenuate a different frequency range of acoustic noise;
wherein a first zone of the two or more zones comprises a first face sheet having a first radial thickness; and
wherein a second zone of the two or more zones comprises a second face sheet having a second radial thickness different from the first radial thickness.

31. The gas turbine engine of claim 30, wherein the fan rotates at frequencies under 1000 Hz and one of the zones of the acoustic liner is tuned to attenuate frequencies under 1000 Hz.

32. The gas turbine engine of claim 31, wherein one of the zones of the acoustic liner is tuned to attenuate frequencies above 1000 Hz.

33. The gas turbine engine of claim 30, wherein the acoustic liner is segmented into discrete axial segments.

34. The gas turbine engine of claim 30, wherein the acoustic liner is segmented into discrete circumferential segments.

35. The gas turbine engine of claim 30, wherein the acoustic liner is segmented into discrete segments and each discrete segment contains a single zone of the multiple zones.

36. The gas turbine engine of claim 30, wherein the acoustic liner is segmented into discrete segments and at least discrete segment contains more than one zone of the multiple zones.

* * * * *

Disclaimer and Dedication

10,066,548 B2 - Gilson, Jonathan, W. Hartford, CT (US); Baltas, Constantine, Manchester, CT ACOUSTIC LINER WITH VARIED PROPERTIES. Patent dated September 4, 2018. Disclaimer file 8, 2020 by the assignee, Raytheon Technologies Corportation.

I hereby disclaim the following complete claims 1-8, 10-27, 29-36 of said patent.

*(Official Gazette, November 23, 2021)*